Figure 1:
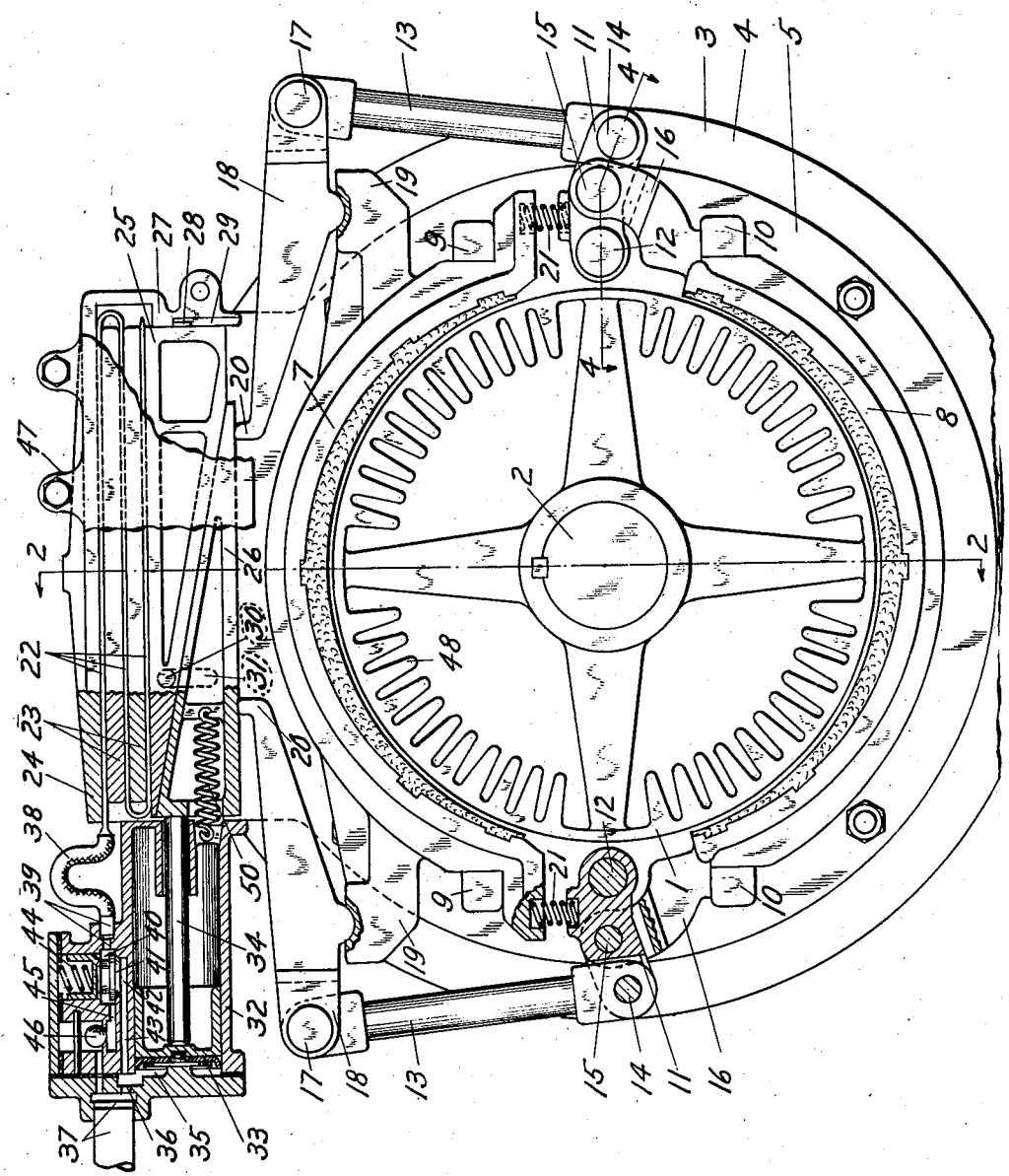

March 28, 1939. C. C. FARMER 2,151,844
FRICTION BRAKE
Filed April 17, 1936 2 Sheets-Sheet 1

INVENTOR
CLYDE C. FARMER
BY Wm. M. Cady
ATTORNEY

March 28, 1939.  C. C. FARMER  2,151,844
FRICTION BRAKE
Filed April 17, 1936   2 Sheets-Sheet 2
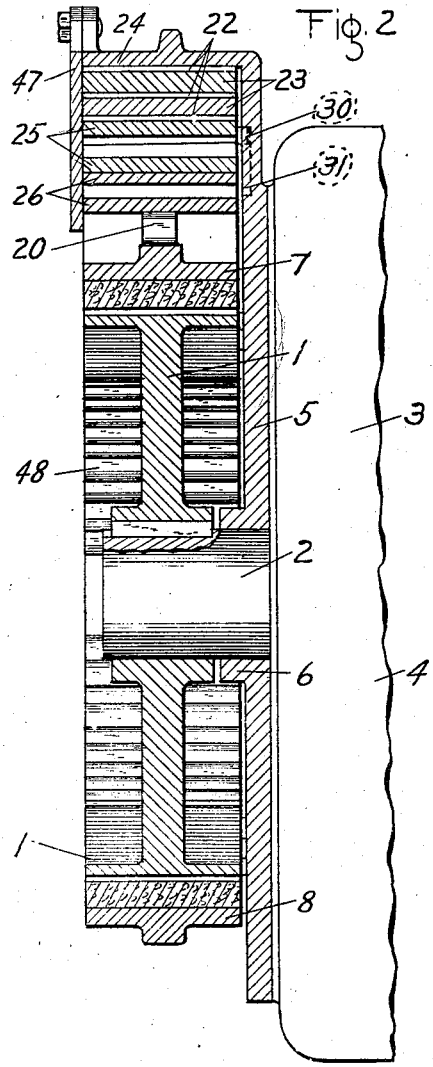
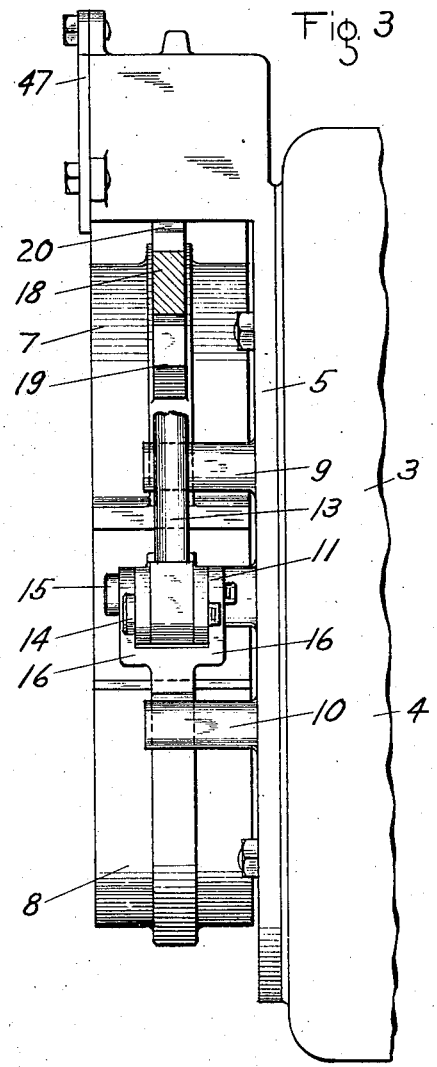
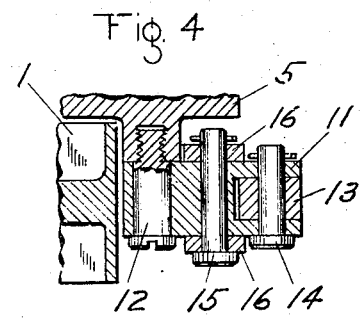
INVENTOR
CLYDE C FARMER
BY *Wm. M. Cady*
ATTORNEY Patented Mar. 28, 1939

2,151,844

UNITED STATES PATENT OFFICE 2,151,844

FRICTION BRAKE

Clyde C. Farmer, Pittsburgh, Pa., assignor to The Westinghouse Air Brake Company, Wilmerding, Pa., a corporation of Pennsylvania Application April 17, 1936, Serial No. 74,831

18 Claims. (Cl. 188—153)

This invention relates to brake apparatus and more particularly to that type of apparatus disclosed in my pending application, Serial No. 74,830 filed April 17, 1936, which is operative in effecting an application of the brakes to first move a brake element such as a brake shoe into engagement with a member to be braked such as a rotatable brake drum and to then apply braking pressure to the brake element, said apparatus comprising a mechanism for moving the brake element into engagement with the brake drum and also comprises an expansible metal tube which cooperates with said mechanism to apply braking pressure to the brake element upon the admission of fluid under pressure thereto.

One object of the invention is to provide an improved brake apparatus of the above mentioned type having means for preventing the expansible metal tube from being crushed when the tube is in its normal contracted condition and the mechanism for moving the brake element into engagement with the brake drum tends to exert pressure on the tube.

Another object of the invention is to provide an improved brake apparatus of the above mentioned type with means whereby a single expansible tubular metal diaphragm is employed to control the braking force on a plurality of brake shoes.

Another object of the invention is to provide an improved clasp brake apparatus having brake shoes disposed at opposite sides of a rotatable brake drum or other member to be braked, which shoes are movable into contact with the member to be braked by means of fluid pressure responsive mechanism and which are adapted to be forced into braking engagement with the member to be braked by means of an expansible tubular metal diaphragm which is not permitted to function until the fluid pressure responsive mechanism functions to move the brake shoes into contact with the member.

Other objects and advantages will appear in the following more detailed description of the invention.

In the accompanying drawings, Fig. 1 is an end elevational view of a brake apparatus embodying the invention, portions of the apparatus being broken away and portions being shown in section to more clearly illustrate the invention; Fig. 2 is a vertical sectional view taken on the line 2—2 of Fig. 1; Fig. 3 is a side elevational view of the apparatus, portions of the mechanism for operating the brake shoes being shown in section; and Fig. 4 is a sectional view taken on the line 4—4 of Fig. 1.

In the drawings the improved brake apparatus is illustrated in conjunction with a brake drum 1 secured to the rotatable armature shaft 2 of an electric motor 3 of the type employed to propel a railway vehicle, but it will be apparent that the apparatus may be employed in combination with a brake drum secured to any other rotatable member.

As shown, the motor 3 comprises a motor frame 4 to which is secured a housing member 5 having a bearing portion 6 in which the armature shaft 2 is journalled. The shaft 2 extends outwardly a short distance beyond the bearing portion 6 and at its end has secured thereto the brake drum 1.

The apparatus comprises arcuate brake shoes 7 and 8, the shoe 7, in the present embodiment of the invention, being arranged at the upper side of the brake drum 1 and the shoe 8 being arranged at the lower side of the drum. Each of the brake shoes is bodily movable in a vertical plane in directions toward and away from the brake drum, the upper brake shoe 7 being slidably guided at each end by a stationary lug 9 preferably integral with the housing member 5 and the shoe 8 being slidably guided at each end by a similar stationary lug 10. The lugs 9 and 10, besides guiding the shoes as they are moved toward and away from the brake drum also serve to prevent the shoes, when in contact with the drum, from being moved in the direction of rotation of the drum.

At each side of the brake drum and between the ends of the brake shoes 7 and 8 is a short transversely extending lever 11 which, at its inner end, is rockably mounted on a pin 12 secured to the housing member 5 and which at its outer end is operatively connected to the lower end of a short substantially vertically disposed pull rod 13 by means of a pin 14. Intermediate its ends this lever is operatively connected, by means of a pin 15, with the end of spaced lugs 16 which extend upwardly from the adjacent end of the brake shoe 8 and which as shown may be integral with the brake shoe.

The upper end of the pull rod 13 is pivotally connected, by means of a pin 17, with the outer end of a transversely extending lever 18 which is pivotally carried, intermediate its ends, by a lug 19 which may be integral with the brake shoe 7. The inner end of the lever 18 is provided with an upwardly directed extension 20 which is operatively engaged by a pressure exerting mechanism hereinafter more fully described.

Interposed between each end of the brake shoe 7 and the adjacent lever 13 and operatively engaging both the lever and the shoe is a release spring 21 which at all times tends to move the shoe and lever toward their release position.

The pressure exerting mechanism above referred to may comprise a tubular expansible metallic diaphragm 22 which, in the present embodiment of the invention, is shown folded to provide three expansible layers which are separated by two vertically movable follower plates 23. The upper layer of the diaphragm is in engagement with an outwardly extending flange 24 of the member 5 and the bottom layer is in operative engagement with the upper face of a wedge member 25 which is in operative engagement with a wedge member 26 which is movable in the direction of its length relative to the wedge member 25. The upwardly directed extensions 20 of the levers 18 are maintained in operative engagement with the lower surface of the wedge member 26 by the action of the release springs 21 and when the wedge member 26 is moved toward the right hand in the direction of its length, the wedge member 25 cooperating therewith moves it downwardly causing the inner ends of both levers 18 to move downwardly as will hereinafter more fully appear.

The right hand end of the wedge member 25 abuts against a vertically disposed outwardly extending flange 27 of the housing 5 and is provided with an outwardly extending stop lug 28 which is received in a vertically extending groove 29 formed in the flange. The rear face of the wedge member is provided with a similar stop lug 30 which is received in a vertically extending groove 31 formed in the adjacent portion of the housing 5. The upper ends of the grooves are closed to form stop shoulders which shoulders with the brake released, engage the lugs and thereby limit upward movement of the wedge member. By limiting the upward movement of the wedge member the possibility of crushing the diaphragm 22 in its contracted state when, as will hereinafter be fully described, the wedge mechanism moves the brake shoes into contact with brake drum 1 prior to the admisson of fluid under pressure to the diaphragm.

The operation of the wedge member 26 is adapted to be effected by means of a cylinder mechanism which is located at one end of the wedge and which comprises a cylinder 32 rigidly secured to the housing 5. Operatively mounted in the cylinder is a piston 33 having a stem 34 which extends through an opening in the non-pressure head of the cylinder into operative engagement with one end of the wedge member 26, the wedge member being slidable on the end of the piston stem.

At one side of the piston 33 is a chamber 35 which is connected through a passage 36 to an application and release passage and pipe 37.

The open end of the diaphragm 22 is connected through a flexible tube 38 and pipe and passage 39 to a chamber 40 provided in the cylinder casing, said chamber containing a piston valve 41 which is adapted to control communication between chamber 40 and a chamber 42 at the other side of the valve piston which is connected through a passage 43 to the piston chamber 35, said valve piston being normally held closed, as shown in Fig. 1, by the action of a coil spring 44.

The valve piston chamber 40 is connected through a unidirectional flow passage 45 to the application and release passage 37, there being a ball check valve 46 interposed in the passage 45 to prevent flow of fluid from passage 37 to chamber 40 and diaphragm 22.

Secured to the end of the flange 24 of the housing member 5 is a vertically disposed cover plate 47 which covers the front faces of the wedge members 25 and 26, diaphragms 22 and follower plates 23 and which serves to prevent undue horizontal outward movement of these parts, undue movement of the parts in the opposite direction being prevented by the rear wall of the housing.

The brake drum 1 may be of any desired construction but as shown in the drawings preferably comprises a spoked wheel having a plurality of radially arranged spaced cooling fins 48 extending inwardly from the rim of the wheel.

When it is desired to effect an application of the brakes, fluid under pressure is supplied to the application and release passage and pipe 37 from any desired source. Fluid under pressure flows from the passage 37 through passage 36 to the piston chamber 35 and causes the piston 33 and its stem 34 to move outwardly. Since the stem 34 is in operative engagement with the wedge member 26, the piston will cause the member to move toward the right. As the wedge member 26 is thus moved the wedge member 25 is maintained against movement in the same direction by the engagement of the right hand end of the member by the flange 27 of the housing 5 and vertical movement of the wedge member 25 is prevented by the engagement of the shoulders at the ends of the grooves 29 and 31 engaging the stop lugs 28 and 30, respectively, of the wedge member. Since the wedge member 25 cannot be moved upwardly the wedge member 26, as it moves longitudinally, is caused to move downwardly. It will here be noted that since the wedge member cannot be moved upwardly from its normal position the diaphragm when fully contracted cannot be crushed when, in initiating an application of the brakes, the piston 33 operates to cause the brake shoes to move into contact with the brake drum.

The wedge 26 as it is thus moved downwardly exerts pressure on the inner ends of the levers 18 causing them to rock about their pivotal connections with the brake shoe 7. Each lever as it is thus rocked, moves the pull rod connected to the outer end thereof upwardly, causing the lever 11 connected to the rod to rock in the same direction about the pin 12, both levers 11 as they are thus operated causing the brake shoe 7 to be moved toward the brake drum 1. At the same time as the brake shoe 7 is being moved toward the brake drum the levers 18 rock on the pins 17 causing the brake shoe 7 to be moved toward the brake drum 1.

At the time the braking surfaces of the brake shoes come in contact with the braking surface of the brake drum, the pressure of fluid in chamber 42 will have been increased sufficiently to cause the valve 41 to move upwardly from its seat against the opposing pressure of the spring 44 so that fluid under pressure now flows from the application and release passage 37 to the diaphragm 22 by way of passage 36, piston chamber 35, passage 43, chamber 42, past the unseated valve 41, through valve chamber 40, passage 39 and flexible tube 38.

Fluid under pressure thus supplied to the diaphragm 22 causes each of the several layers thereof to expand and apply braking force to the brake shoes through the medium of the wedges 25 and 26 and the mechanisms associated therewith and the brake shoes.

To release the brakes the application and release pipe 37 is connected to the atmosphere and as a result fluid under pressure is released from said pipe and consequently from the piston chamber 35, chamber 40 and diaphragm 22. As the pressure of fluid in the diaphragm reduces by such flow the several layers of the diaphragm 22 contract thereby relieving the brake shoes of braking force. It will here be noted that when the pressure of fluid in chamber 40 has been reduced to such a degree that the spring will act to seat the piston valve 41, the flow of fluid from the diaphragm 22 will continue by way of passage 45, past the ball check valve 46 to the passage and pipe 37.

Now when the pressure of fluid in piston chamber 35 has been reduced to some low degree, a spring 50 which is connected at one end to the wedge member 26 and at the other end to the cylinder casing 32, acts to move the wedge member 26 toward the left to its release position, said wedge member being in engagement with the piston stem 34, causing the piston 33 to be moved to its normal position as shown in Fig. 1.

As the wedge member 26 is thus moved, the release springs 21 act to cause the brake shoes 7 and 8 to be moved out of contact with the brake drum and act through the brake shoe 7, levers 11, pull rods 13, and levers 18 to cause the wedge member to move upwardly to thereby remain in operative engagement with the wedge member 25.

While one illustrative embodiment of the invention has been described in detail, it is not my intention to limit its scope to that embodiment or otherwise than by the terms of the appended claims.

Having now described by invention, what I claim as new and desire to secure by Letters Patent, is:

1. In a fluid pressure brake apparatus, in combination, a rotatable member to be braked, a brake element adapted to engage said member, a stationary housing, mechanism operative in initiating an application of the brakes for moving said element into engagement with said member, an expansible metal tube adapted to be expanded by fluid under pressure after the application of the brakes is initiated for applying braking force to said mechanism and thereby to said element when the element is in engagement with said member, means operative automatically in initiating the application of the brakes for admitting fluid under pressure to said metal tube and means included in said mechanism adapted to cooperate with said housing for preventing the transmission of pressure from said mechanism to said tube when the mechanism is operated.

2. In a fluid pressure brake apparatus, in combination, a rotatable member to be braked, a brake element adapted to engage said member, a housing, mechanism carried by said housing operative in initiating an application of the brakes for moving said element into engagement with said member, an expansible metal tube interposed between and engaging said housing and mechanism adapted to be expanded by fluid under pressure after the application of the brakes has been initiated to apply braking pressure to said element when the element is in engagement with said member, stop shoulders on said housing, and stop lugs on said mechanism adapted to engage with said shoulders to prevent the mechanism from moving to collapse said tube when the mechanism is operated to move said element into engagement with said member.

3. In a fluid pressure brake apparatus, in combination, a rotatable member to be braked, a brake element adapted to engage said member, a stationary housing, mechanism including two cooperating wedge members operative in effecting an application of the brakes for moving said element into engagement with said member, a fluid pressure responsive expansible tube associated with said wedge members, means on one of said wedge members adapted to cooperate with said housing for preventing said mechanism from collapsing said tube when the mechanism is operated to move said element into engagement with said member, and means operative automatically after said mechanism has been set in operation to effect the expansion of said tube to apply braking pressure to said element.

4. In a fluid pressure brake apparatus, in combination, a rotatable member to be braked, a brake element adapted to engage said member, a stationary housing, mechanism carried by said housing and operative in effecting an application of the brakes for moving said element into engagement with said member, a tube mounted in said housing and associated with said mechanism and normally connected to the atmosphere and adapted to be expanded by fluid under pressure to apply said element with pressure to said member, means for delaying the supply of fluid under pressure to said tube while said mechanism is operating to move said element into engagement with said member, and means included in said mechanism and cooperating with said housing for preventing said mechanism, as it is operated, from collapsing said tube.

5. In a fluid pressure brake, in combination, a rotatable member to be braked, a brake element normally spaced away from said member and movable into engagement therewith, a stationary housing, mechanism including means cooperating with said housing and operative by fluid under pressure supplied thereto for moving said element into engagement with said member, and a metal tube associated with said mechanism and cooperating with said housing adapted to be expanded to apply pressure to said element only when the pressure of fluid supplied to said mechanism is sufficient under normal operating conditions to cause the mechanism to operate to move said element into engagement with said member, said means also cooperating with said housing for preventing said tube from being collapsed when said mechanism is operating to move said element into engagement with said member.

6. In a clasp brake apparatus, in combination, a rotatable member to be braked, two brake shoes arranged one at each side of said member, two sets of operatively connected levers for simultaneously moving said brake shoes in opposite directions into engagement with said member, means operative by fluid under pressure for actuating said two sets of mechanisms, to move the brake shoes in engagement with said member, an expansible hollow diaphragm cooperating with said means and operable by fluid under pressure to apply said shoes with pressure to said member, and means preventing the fluid pressure operated means, when being actuated, from exerting pressure on said diaphragm.

7. In a clasp brake apparatus, in combination, a rotatable member to be braked, two brake shoes arranged one at each side of said member, two sets of operatively connected levers for simultaneously moving said brake shoes in opposite directions into engagement with said member, means operative by fluid under pressure for actuating said two sets of mechanisms, to move the brake shoes in engagement with said member, an expansible metal tube cooperating with said means and operable by fluid under pressure to apply said shoes with pressure to said member, and means for preventing the fluid pressure operated means when being actuated from exerting pressure on said diaphragm.

8. In a clasp brake apparatus, in combination, a rotatable member to be braked, two brake shoes arranged one at each side of said member, two sets of operatively connected levers for simultaneously moving said brake shoes in opposite directions into engagement with said member to thereby take up slack in the apparatus, means operative by fluid under pressure for actuating said two sets of levers to move the brake shoes to take up the slack in the apparatus, other means operative by fluid under pressure for applying braking pressure to the first mentioned means and thereby to said two sets of levers and brake shoes, and means preventing the first mentioned fluid pressure operated means from exerting pressure on said other means when the first mentioned fluid pressure operated means is being operated to move said shoes to take up slack.

9. In a clasp brake apparatus, in combination, a rotatable member to be braked, two brake shoes arranged one at each side of said member, two sets of operatively connected levers for simultaneously moving said brake shoes in opposite directions into engagement with said member to thereby take up slack in the apparatus, means operative by fluid under pressure for actuating said two sets of levers to move the brake shoes to take up the slack in the apparatus, and a metal tube adapted to be expanded by fluid under pressure for applying braking pressure to said means and thereby to said levers and brake shoes, said means being operative to actuate said sets of levers without exerting pressure on said metal tube.

10. In a clasp brake apparatus, in combination, a rotatable member to be braked, two brake shoes arranged one at each side of said member, two sets of operatively connected levers for simultaneously moving said brake shoes in opposite directions into engagement with said member to thereby take up slack in the apparatus, means operative by fluid under pressure for actuating said two sets of levers to move the brake shoes to take up the slack in the apparatus, a metal tube adapted to be expanded by fluid under pressure for applying braking pressure to said means and thereby to said levers and brake shoes, valve means for delaying the supply of fluid under pressure to said tube until the pressure of fluid supplied to said means is sufficient under normal conditions to cause the operation of the means, and means for preventing said means in effecting the operation of said sets of levers from exerting pressure on said tube.

11. In a fluid pressure brake, in combination, a rotatable member to be braked, a brake element adapted to engage said member, mechanism operative in effecting an application of the brakes to move said element into engagement with said member, a housing having a flange spaced from said mechanism, and fluid pressure responsive means interposed between and engaging said flange and mechanism and operative by fluid under pressure in effecting the application of the brakes to apply pressure to said mechanism and thereby to said element.

12. In a fluid pressure brake, in combination, a rotatable member to be braked, a brake element adapted to engage said member, mechanism operative in effecting an application of the brakes to move said element to take up the slack between said element and member, a stationary housing having a flange spaced from said mechanism, and expansible fluid pressure responsive means interposed between and engaging said flange and mechanism adapted to be expanded to apply braking pressure to said mechanism and thereby to said element when under normal operating conditions the slack between said element and member is taken up.

13. In a fluid pressure brake, in combination, a rotatable member to be braked, a brake element adapted to engage said member, a stationary housing, mechanism carried by said housing operative in effecting an application of the brakes to move said element into engagement with said member, mechanically expansible means cooperating with said housing and mechanism for actuating said mechanism, fluid pressure expansible means cooperating with said housing for applying pressure to said mechanically expansible means and thereby to said mechanism and element when, under normal operating conditions, the slack between said element and member has been taken up, and means for preventing said mechanical expansible means from exerting pressure on said fluid pressure expansible means prior to the operation of the fluid pressure expansible means.

14. In a fluid pressure brake, in combination, a rotatable member to be braked, a brake element adapted to engage said member, a stationary housing, mechanism carried by said housing operative in effecting an application of the brakes to move said element into engagement with said member, mechanically expansible means carried by said housing for actuating said mechanism, fluid pressure expansible means carried by said housing for applying pressure to said mechanically expansible means and thereby to said mechanism and element when, under normal operating conditions, the slack between said element and member has been taken up, and means for preventing the force of the mechanically expansible means when being expanded from being transmitted to said fluid pressure expansible means.

15. In a fluid pressure brake apparatus, in combination, a rotatable member to be braked, a brake element adapted to engage said member, a stationary housing, mechanism operative in applying the brake for first moving said brake element into engagement with said member, means including an expansible tube which is then expanded by fluid under pressure to apply pressure through said mechanism to said element, and means included in said mechanism adapted to engage said housing for preventing the transmission to said tube of pressure exerted by the initial operation of said mechanism.

16. In a fluid pressure brake apparatus, in combination, a rotatable member to be braked, a brake element adapted to engage said member, an expansible tube adapted to be expanded by fluid under pressure to apply pressure to said element, a mechanism having a member interposed between said tube and said element and operative to move said element relatively to said tube into engagement with said rotatable member, and means for preventing the transmission to said tube of pressure exerted by the operation of said mechanism.

17. In a clasp brake apparatus, in combination, a casing, a rotatable member to be braked, two brake shoes arranged one at each side of said member, two sets of operatively connected levers for moving said shoes in opposite directions into engagement with said member, each of said sets of levers comprising a lever fulcrumed intermediate its ends on one of said shoes, a level fulcrumed at one end to said casing and operatively connected intermediate its ends to the other of said shoes, a rod operatively connecting outer ends of said levers, mechanically expansible means operative for actuating the levers fulcrumed to the brake shoe for moving the brake shoes to take up slack between the shoes and the member, and fluid pressure expansible means for exerting braking force on said mechanically expansible means and thereby on said sets of levers.

18. In a clasp brake apparatus, in combination, a casing, a rotatable member to be braked, two brake shoes arranged on at each side of said member, two sets of operatively connected levers for moving said shoes in opposite directions into engagement with said member, each of said sets of levers comprising a lever fulcrumed intermediate its ends on one of said shoes, a lever fulcrumed at one end to said casing and operatively connected intermediate its ends to the other of said shoes, a rod operatively connecting outer ends of said levers, mechanically expansible means operative for actuating the levers fulcrumed to the brake shoe for moving the brake shoes to take up slack between the shoes and the member, fluid pressure expansible means engaging said casing and mechanically expansible means for exerting braking force on the mechanically expansible means and thereby on said sets of levers, and means included in said mechanically expansible means cooperating with said casing to prevent the mechanically expansible means for exerting pressure on the fluid pressure expansible means when the mechanically expansible means is operated to move said brake shoes to take up slack.

CLYDE C. FARMER.